(12) United States Patent
Sangu (10) Patent No.: US 10,110,811 B2
(45) Date of Patent: Oct. 23, 2018

(54) IMAGING MODULE AND IMAGING DEVICE (71) Applicant: Suguru Sangu, Miyagi (JP)

(72) Inventor: Suguru Sangu, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/101,766

(22) PCT Filed: Jan. 8, 2015

(86) PCT No.: PCT/JP2015/050993
§ 371 (c)(1),
(2) Date: Jun. 3, 2016

(87) PCT Pub. No.: WO2015/105199
PCT Pub. Date: Jul. 16, 2015

(65) Prior Publication Data
US 2016/0316142 A1    Oct. 27, 2016

(30) Foreign Application Priority Data
Jan. 10, 2014   (JP) ................. 2014-003637

(51) Int. Cl.
*H04N 5/225* (2006.01)
*G02B 27/42* (2006.01)
(Continued)

(52) U.S. Cl.
CPC ....... *H04N 5/23235* (2013.01); *G02B 26/004* (2013.01); *G02B 26/02* (2013.01);
(Continued)

(58) Field of Classification Search
CPC ............. H04N 5/23235; H04N 5/2252; H04N 5/2253; H04N 5/2254; H04N 5/2257;
(Continued)

(56) References Cited

U.S. PATENT DOCUMENTS 7,724,347 B2 *   5/2010   Tseng ................. G02B 1/06
                                                              349/200
2006/0157640 A1   6/2006   Perlman et al.
(Continued)

FOREIGN PATENT DOCUMENTS

CN   102438102 A   5/2012
JP   4-61379      2/1992
(Continued)

OTHER PUBLICATIONS

European search report dated Sep. 28, 2016 in corresponding European Patent Application No. 15735477.0.
(Continued)

*Primary Examiner* — Twyler Haskins
*Assistant Examiner* — Fayez Bhuiyan
(74) *Attorney, Agent, or Firm* — Cooper & Dunham LLP (57) ABSTRACT

An imaging module has a spatial light modulation element which applies spatial modulation to an incident luminous flux and emits it; an image sensor which obtains the luminous flux to which the spatial modulation has been applied by the spatial light modulation element as image information; and a fixing part which integrally fixes the spatial light modulation element and the image sensor, and the fixing part has a gap-defining member which is arranged between the spatial light modulation element and the image sensor and forms a gap structure having a certain distance, and an imaging device includes the imaging module.

10 Claims, 7 Drawing Sheets

(51) Int. Cl.
H04N 5/232 (2006.01)
H04N 5/238 (2006.01)
G03B 11/00 (2006.01)
H04N 5/335 (2011.01)
G02B 26/00 (2006.01)
G02B 26/02 (2006.01)
G02F 1/133 (2006.01)
G02F 2/00 (2006.01)

(52) U.S. Cl.
CPC .......... *G02F 1/13306* (2013.01); *G02F 2/00* (2013.01); *G03B 11/00* (2013.01); *H04N 5/2252* (2013.01); *H04N 5/2253* (2013.01); *H04N 5/2254* (2013.01); *H04N 5/2257* (2013.01); *H04N 5/238* (2013.01); *H04N 5/335* (2013.01); *G02B 2207/129* (2013.01)

(58) Field of Classification Search
CPC ...... H04N 5/238; H04N 5/335; G02B 26/004; G02B 26/02; G02F 1/13306; G02F 2/00; G03B 11/00
See application file for complete search history.

(56) References Cited

U.S. PATENT DOCUMENTS

| | | |
|---|---|---|
| 2006/0262398 A1 | 11/2006 | Sangu et al. |
| 2007/0081200 A1 | 4/2007 | Zomet et al. |
| 2008/0001069 A1 | 1/2008 | Perlman et al. |
| 2008/0100905 A1 | 5/2008 | Kato et al. |
| 2008/0187305 A1 | 8/2008 | Raskar et al. |
| 2009/0095912 A1 | 4/2009 | Slinger et al. |
| 2010/0061218 A1 | 3/2010 | Miura |
| 2010/0098323 A1 | 4/2010 | Agrawal et al. |
| 2010/0265386 A1 | 10/2010 | Raskar et al. |
| 2011/0019256 A1 | 1/2011 | Miyagawa et al. |
| 2011/0157393 A1 | 6/2011 | Zomet et al. |
| 2012/0038786 A1 | 2/2012 | Kelly et al. |
| 2012/0038789 A1 | 2/2012 | Kelly et al. |
| 2012/0038790 A1 | 2/2012 | Kelly et al. |
| 2012/0038798 A1 | 2/2012 | Woods et al. |
| 2012/0038805 A1 | 2/2012 | Kelly et al. |
| 2012/0038817 A1 | 2/2012 | McMackin et al. |
| 2012/0038819 A1 | 2/2012 | McMackin et al. |
| 2012/0235027 A1 | 9/2012 | Sangu et al. |
| 2012/0241597 A1 | 9/2012 | Bridge et al. |
| 2013/0169643 A1 | 7/2013 | Suh et al. |
| 2014/0002721 A1 | 1/2014 | Baraniuk et al. |
| 2014/0009638 A1 | 1/2014 | Baraniuk et al. |
| 2014/0104487 A1 | 4/2014 | Bridge et al. |
| 2016/0078628 A1 | 3/2016 | Suh et al. |

FOREIGN PATENT DOCUMENTS

| | | |
|---|---|---|
| JP | 2004-184447 | 7/2004 |
| JP | 2005-316316 | 11/2005 |
| JP | 2005-316321 | 11/2005 |
| JP | 2008-107826 | 5/2008 |
| JP | 2008-191661 | 8/2008 |
| JP | 2008-542863 | 11/2008 |
| JP | 2010-25927 | 2/2010 |
| JP | 2013-106217 | 5/2013 |
| JP | 2013-535931 | 9/2013 |

OTHER PUBLICATIONS

Matthew Hirsch et al, "BiDi Screen: A Thin, Depth-Sensing LCD for 3D Interaction using Light Fields", ACM Transactions on Graphics, vol. 28, No. 5, Article 159, (Dec. 2009).

International Search Report dated Apr. 21, 2015 in PCT/JP2015/050993 filed on Jan. 8, 2015.

Beni, G. and Hackwood, S., 'Appl. Phys. Lett. vol. 38, Issue 4', p. 207-209, USA, 1981.

Chinese official action dated Jun. 7, 2018 (and English translation thereof) in corresponding Chinese Patent Application No. 201580008026.3.

* cited by examiner

IMAGING MODULE AND IMAGING DEVICE

TECHNICAL FIELD

The present invention relates to an imaging module and an imaging device using coded-aperture imaging.

BACKGROUND ART

An imaging device represented by a camera is widely used for photographing for appreciating photography, an industrial measurement/object recognition system, risk detection for vehicle, a crime-prevention monitoring system, and the like. In those use forms, it is often necessary to obtain not only an image of a photographic subject but also spatial information such as a distance, a visual field direction, and the like.

As a technique which makes it possible to obtain the spatial information, by use of an image sensor and a coded-aperture pattern, a technique is known in which information on a space and an incidence angle of a luminous flux incident to the image sensor is obtained by performing decoding processing based on Fourier transform (for example, see Japanese Patent Application Publication No. 2008-191661).

Additionally, by using a reconstructible or active spatial light modulation element as the coded-aperture pattern, a technique is known in which an image quality is improved from an image imaged by a plurality of types of coded-aperture patterns by performing decoding processing (for example, see Japanese Patent Application Publication No. 2008-542863).

Furthermore, as an element used as such a spatial light modulation element, a liquid crystal element, or alternate technique, or the like has been proposed (for example, see Japanese Patent Application Publication Numbers 2005-316321, 2005-316316, and Beni, G. and Hackwood, S., 'Appl. Phys. Lett. Vol. 38, Issue 4', 207-209, USA, 1981).

SUMMARY OF THE INVENTION

However, in an imaging device using a conventional coded-aperture imaging technique and a coded-aperture pattern, an image sensor and the coded-aperture pattern are individually arranged, and it is necessary to provide the coded-aperture pattern in an optical path. And additionally, a problem on mounting has occurred in that the size of an imaging device increases, a conflict of mounting position between optical components such as a movable mirror, and the like occurs, high accuracy is required for an arrangement position between the coded-aperture pattern and the image sensor, it is difficult to deal with the change of an optical system such as a lens, or the like, and so on.

An object of the present invention is to provide an imaging device in which by using an imaging module in which an image sensor and a spatial modulation element which applies spatial modulation to an image by a coded-aperture pattern are integrated, a distance between the image sensor and the coded-aperture pattern is short, and the image sensor and the coded-aperture pattern are arranged with high accuracy.

In order to solve the above problem, an embodiment of the present invention provides an imaging module comprising a spatial light modulation element which applies spatial modulation to an incident luminous flux and emits it; an image sensor which obtains the luminous flux to which the spatial modulation has been applied by the spatial light modulation element as image information; and a fixing part which integrally fixes the spatial light modulation element and the image sensor, wherein the fixing part has a gap-defining member which is arranged between the spatial light modulation element and the image sensor and forms a gap structure having a certain distance, and an imaging device comprising the above imaging module.

DESCRIPTION OF EMBODIMENTS

Figure 1:
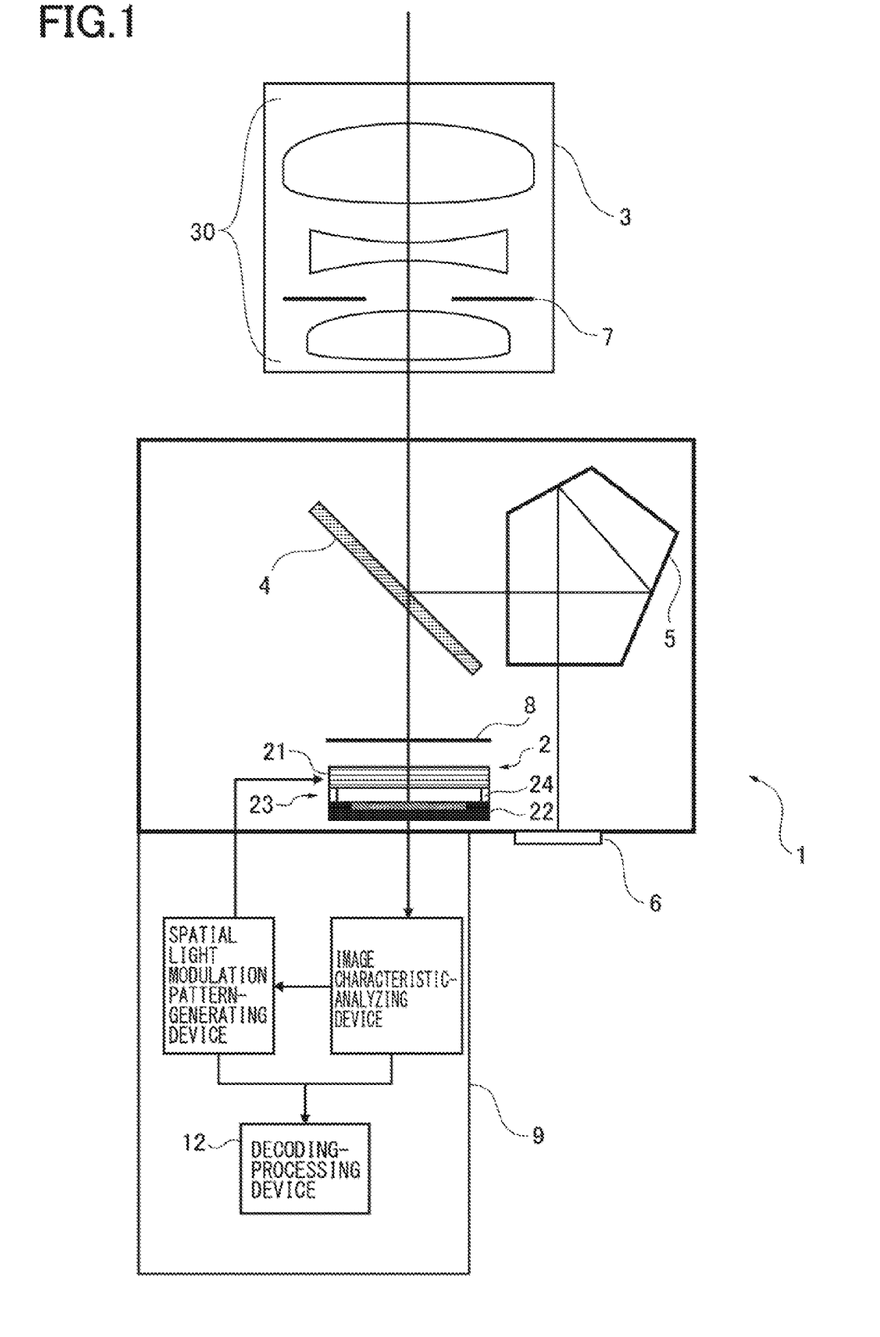
FIG. 1 is a diagram showing one example of an entire structure of an imaging device and an imaging module in an embodiment of the present invention.

An imaging device shown in FIG. 1 in the present embodiment has an imaging module 2 which obtains an image, an image-forming optical system 3 which images and emits an incident luminous flux toward the imaging module 2, and a mirror 4 which selects an optical path from the image-forming optical system 3.

The imaging device 1 also has a finder 6 which confirms a visual field, a deflection element 5 which deflects light from the mirror 4 to the finder 6, a shutter 8 which determines an exposure time, and a controller 9 which controls those members.

The above structure other than the imaging module 2 is equal to a general single-lens reflex camera; however, the structure can be a structure of a so-called mirrorless single-lens reflex camera in which the finder 6 and the mirror 4 are removed, and instead a liquid crystal monitor is included.

Figure 2:
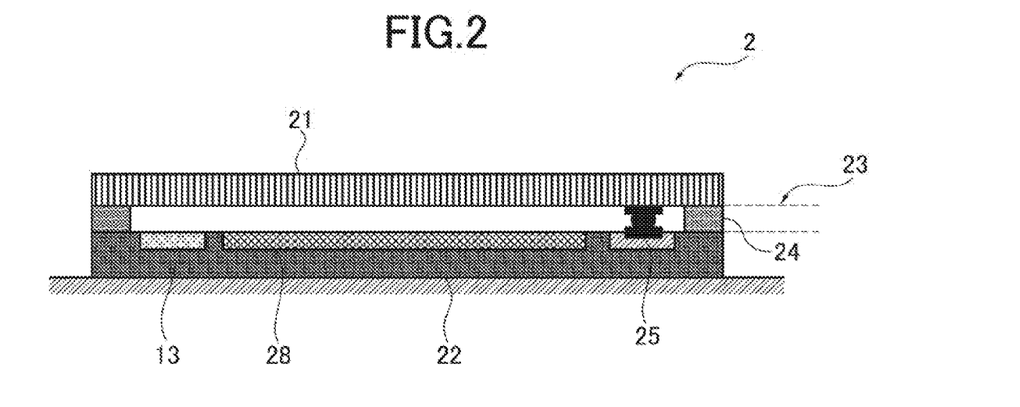
FIG. 2 is a diagram showing one example of a structure of the imaging module in the embodiment of the present invention.

With reference to FIG. 2, a structure of the imaging module 2 will be explained.

The imaging module 2 has a spatial light modulation element 21 which applies spatial modulation to an incident luminous flux and emits it, an image sensor 22 which obtains the luminous flux to which the spatial modulation has been applied as image information, and a fixing part 23 which integrally fixes the spatial light modulation element 21 and the image sensor 22.

The imaging module 2 also has a wiring 25 which electrically connects the spatial light modulation element 21 and the image sensor 22, and a logic circuit 13 which processes a signal from the controller 9.

The spatial light modulation element 21 is a transmissive liquid crystal device and applies spatial modulation to an incident luminous flux by changing transmittance at each position by the controller 9 to form a coded-aperture pattern, in other words, a mosaic pattern.

The image sensor 22 is an image sensor which uses a CCD (Charge-Coupled Device) as a light detector array, which is an imaging plane, and obtains the luminous flux to which the spatial modulation has been applied by the spatial light modulation element 21 as image information. On the image sensor 22, a light detector array 28 is arranged in which a plurality of photodiodes as light detectors, which are light-receiving elements, are arranged side by side. The image sensor 22 converts information such as intensity of the luminance flux incident to the imaging plane and the like to an electric signal. Here, the CCD is used; however, if an image sensor is capable of obtaining image information, a CMOS (Complementary Metal-Oxide Semiconductor), or the like can be used.

The fixing part 23 has a gap-defining member 24 which is arranged between the spatial light modulation element 21 and the image sensor 22 and forms a gap structure having a certain distance.

The fixing part 23 fixes the spatial light modulation element 21 and the image sensor 22 with the certain distance in parallel. Here, the fixing part 23 can be a fixing part which uses a fixing member such as a screw, or the like, uses an adhesive agent, or the like, or with which the light modulation element 21 and the image sensor 22 are formed integrally.

In the present embodiment, the gap-defining member 24 is a Si substrate in which a space is provided, and the gap-defining member 24 has a function as the fixing part 23. The gap-defining member 24 makes contact with at least one of the spatial light modulation element 21 and the image sensor 22, and by the opening and the thickness of the Si substrate, forms a void structure of less than or equal to a few mm, preferably less than or equal to 1 mm, in other words, a gap structure between the spatial light modulation element 21 and the image sensor 22. Here, the gap-defining member 24 is the Si substrate with the opening; however, a transparent material such as a glass material, or a joining material such as a bead-dispersed glass frit material can be used. In a case where a transparent material is used as the gap-defining member 24, since passing of a luminance flux is not obstructed, the gap structure does not need to be the void structure, and a gap distance which is the distance between the spatial light modulation element 21 and the image sensor 22 is controlled by the thickness of the transparent material. The wiring 25 is formed by using wire bonding.

The wiring 25 can be a through wiring 26 which penetrates at least one of the spatial light modulation element 21 and the image sensor 22 and electrically connects the spatial light modulation element 21 and the image sensor 22. The through wiring 26 will be explained in detail later.

The logic circuit 13 functions as a spatial modulation pattern-generating assistant device or a control assistant device which operates in accordance with an electric signal from the controller 9.

The image-forming optical system 3 has an image-forming lens group 30 which includes at least one or more lenses which are arranged so as to form an image on the image sensor 22 and an aperture 7 which adjusts an incident light amount. The image-forming optical system 3 is arranged such that a luminous flux incident to the imaging device 1 forms an image on the image sensor 22. In other words, the image-forming optical system 3 is arranged on an upper stream side in the direction of an optical axis from the imaging module 2 such that a focal point is located on the image sensor 22.

The luminous flux incident to the imaging device 1 is deflected to form an image on the image sensor 22 by the image-forming lens group 30, and a light amount is adjusted by passing through the aperture 7.

The luminous flux passing through the image-forming optical system 3 is reflected by the mirror 4 and guided to the finder 6 via the deflection element 5, when photographing is not performed. When photographing is performed, the mirror 4 operates so as to pass the luminous flux from the image-forming optical system 3. The mirror 4 thus operates as a movable mirror, which is an optical path-selecting device.

Spatial modulation is applied to the luminous flux passing through the mirror 4 and incident to the spatial light modulation element 21 by the spatial light modulation element 21.

The controller 9, which is an element driver, controls a transmittance distribution of the spatial light modulation element 21 by use of a spatial transmittance distribution in which a plurality of sine waveforms different in cycle are superimposed.

Hereinafter, a minimum unit in which this transmittance distribution can be controlled is referred to as a cell.

The spatial light modulation element 21 forms a coded-aperture pattern by changing transmittance in each cell on the element in accordance with an electric signal, in other words, a periodic modulation signal, from the controller 9, which is the element driver.

That is, the spatial light modulation element 21 applies spatial modulation to the luminous flux passing through the spatial light modulation element 21 by periodically changing transmittance of each cell on the element.

At this time, the controller 9, which is the element driver, functions as a spatial light modulation pattern-generating device.

In a case of forming the coded-aperture pattern by use of such a spatial transmittance distribution, at spatial frequency positions corresponding to cycles of the sine waveforms, that is, on a horizontal axis in a case of performing Fourier transform, a spectral distribution of a limited spatial frequency band which an image itself has is copied in a form of convolution.

That is, the spectral distribution of the spatial frequency of the photographic subject is copied on an axis of the spatial frequency, as many as the number of cycles of the sine waveforms. Here, field angle division is possible by being mixed with frequency information of an angle component depending on the magnitude of a frequency of a sine waveform (for example, see Beni, G. and Hackwood, S., 'Appl. Phys. Lett. Vol. 38, Issue 4', 207-209, USA, 1981).

Here, in a case where an interval of a spatial frequency corresponding to a cycle of an adjacent sine waveform is narrower than a spatial frequency band of a photographic subject, aliasing occurs in which a high frequency component of a spatial frequency interferes with a low frequency component. As a result, deterioration of an image in which the field angle is divided, superimposition of noise in a restored image, and the like occur. In order to prevent those, it is necessary to differentiate a spatial frequency band which the obtained image information has from a cycle of a sine waveform which is given to the spatial light modulation element 21 by approximately a degree in which aliasing does not occur.

Figure 3:
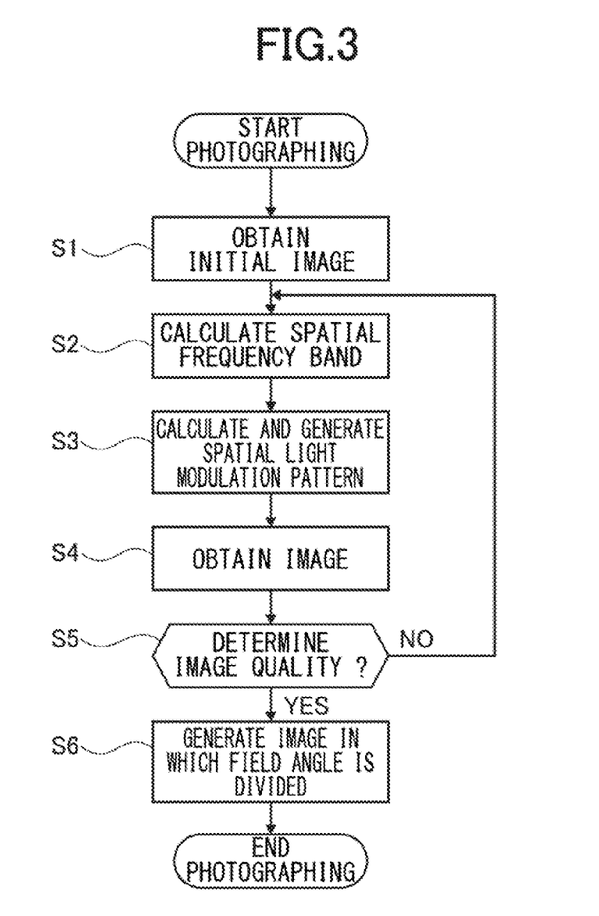
FIG. 3 is a diagram showing one example of an operation of an optimizer of the imaging device in the embodiment of the present invention.

A processing flow to thus prevent aliasing will be explained with reference to FIG. 3.

Here, in the present embodiment, each of an image characteristic-analyzing device, the spatial light modulation pattern-generating device, an image quality-determining device, and a decoding-processing device 12 is a function of the controller 9.

Firstly, the controller 9 obtains an initial image regarding a case without spatial modulation, or a case where a certain spatial modulation is performed (Step S1).

A spatial frequency band of the initial image is analyzed by the controller 9 as the image characteristic-analyzing device. The controller 9 determines a necessary frequency of a sine waveform which is applied to the spatial light modulation element 21 by analyzing the spatial frequency band of the initial image (Step S2).

Then, the controller 9, which is the spatial light modulation pattern-calculating device or the spatial light modulation pattern-generating device, calculates and generates a spatial light modulation pattern based on the frequency of the sine waveform obtained in the above processing (Step S3). At this time, the controller 9 has a function as a coded-aperture pattern-calculating device or a coded-aperture pattern-generating device. Based on the spatial light modulation pattern obtained in Step S3, the controller 9, which is the element driver, changes transmittance of the spatial light modulation element 21 and obtains image information again (Step S4).

Additionally, the controller 9 as the image quality-determining device determines whether an image quality of the obtained image information is sufficiently favorable or not, in other words, whether a spatial light frequency of the obtained image information is within a condition in which aliasing does not occur or not (Step S5). In a case where it is determined to be insufficient, the processing returns to Step S2, the analysis of the spatial frequency is performed, and the same processings as above are repeated, that is, the image quality is optimized to the condition in which aliasing does not occur by a feedback mechanism. At the time of completing the optimization of the image quality, desired spatial information, in this case, image information in which field angle is divided is obtained (Step S6).

The luminous flux to which spatial modulation has been applied is recognized as image information by detecting the image sensor 22. This image information includes information on which cell on the spatial light modulation element 21 and what time the luminous flux has passed through by being applied with the spatial modulation in accordance with the periodic modulation signal.

That is, from image information and a position on the image sensor 22 where the image information has been detected, angle information of the luminous flux detected by the image sensor 22, in other words, information of a direction component of the luminous flux is obtained.

From the thus obtained image information, by removing the spatial modulation and reconstructing an image by use of the decoding-processing device 12, without a special device structure such as provision of a plurality of imaging devices, or the like, and an image including spatial information such as a distance, a direction, and the like is obtained.

In the present embodiment, a specific photographic subject included in an image is taken as a target, and distance resolution is optimized, and this makes it possible to obtain distance information to the photographic subject.

Figure 4:
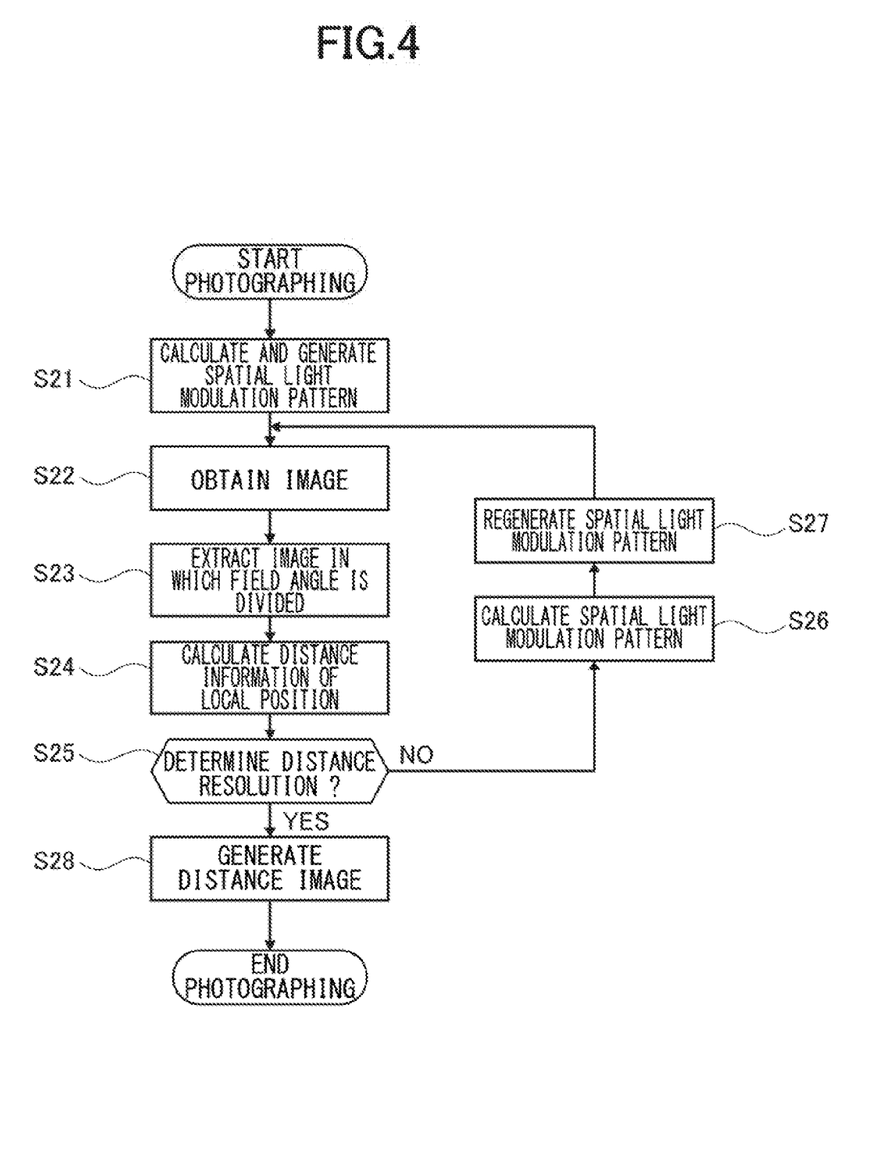
FIG. 4 is a diagram showing one example of an operation of an element driver of the imaging device in the embodiment of the present invention.

Regarding a method of obtaining such spatial information, obtaining distance information as an example will be explained with reference to FIG. 4.

Note that a detailed explanation of a method of calculating disparity information from a plurality of images in which the field angle is divided will be appropriately omitted.

Firstly, the controller 9 as the spatial light modulation-generating device generates an arbitrary spatial light modulation pattern (Step S21). The controller 9 obtains an image by use of the arbitrary spatial light modulation pattern generated in Step S21 (Step S22), and extracts a plurality of image information in which the field angle is divided (Step S23). Next, the controller 9 as a distance resolution-determining device, which is the image characteristic-analyzing device, analyzes the image information in which the field angle is divided, and calculates distance information regarding a local position of a photographic subject, which is a specific target in the image (Step S24). By use of the distance information calculated in Step S24, the controller 9 as the distance information-determining device determines whether desired resolution is obtained in the obtained image or not (Step S25). In a case where the resolution of the obtained image is insufficient, the controller 9 as the spatial light modulation pattern-generating device calculates a cycle of a sine waveform constituting a spatial light modulation pattern again (Step S26). By changing field angle division resolution based on the spatial light modulation pattern calculated in Step S26, the controller 9 generates a spatial light modulation pattern again and obtains a new image (Step S27). The distance resolution is optimized by a distance resolution optimizing mechanism which forms such a feedback loop, and a distance image which is suitable for the photographic subject as the target is finally obtained (Step S28).

At this time, resolution of angle information of the luminous flux obtained by the imaging module 2 and a viewing angle of the obtained image information is determined by the size of the image sensor 22, the size of each cell of the spatial light modulation element 21 and a distance between the image sensor 22 and the spatial light modulation element 21, that is, a gap distance.

However, in the conventional technique, a coded-aperture pattern and a light detection array are each independently arranged and controlled, and it is difficult to adjacently arrange them. Additionally, in a case of using a structure which actively changes a pattern such as a liquid crystal element as a coded-aperture pattern, electrical connection is essential to the liquid crystal element; however, there is a possibility of breakage by a known method such as wire bonding, or the like, and a problem on mounting is not solved. Such a problem is not considered as a problem when the gap distance is comparatively large.

Accordingly, in the imaging module 2 in the present embodiment of the present invention, the fixing part 23 integrally fixes the spatial light modulation element 21 and the image sensor 22, and has a gap-defining member 24 which is arranged between the spatial light modulation element 21 and the image sensor 22 to form a gap structure having a certain distance.

With such a structure, the spatial light modulation element 21 and the image sensor 22 are integrated and modulization is performed, and therefore, the gap distance is shortened, positions of the image sensor 22 and the spatial light modulation element 21 are adjusted with high accuracy, and image information with high angle resolution and high accuracy is obtained.

The spatial light modulation element 21 in the present embodiment forms a reconstructible coded-aperture pattern which periodically changes transmittance, and a high-frequency signal is used for such control. Generally, in a circuit using a high-frequency signal, the length of a wiring is preferably short to suppress noise or loss of signal.

As the spatial light modulation element 21, a transmissive liquid crystal device is used, and therefore, it is possible to directly use a device or a controller available on the market, and in addition to the above effect, the cost is reduced and image information including spatial information is obtained.

Further, in addition to the liquid crystal device, the spatial light modulation element 21 can be a wet capillary type spatial light modulation element 21 (for example, see Japanese Patent Application Publication Numbers 2005-31632 and 2005-316316, and Beni, G and Hackwood, S., 'Appl. Phys. Lett. Vol. 38, Issue 4', 207-209, USA, 1981).

The wet capillary type spatial light modulation element 21 has a microporous structural body which is capable of storing liquid, and a transmittance-controlling device which adjusts an amount of the liquid in the microporous structural body by an electric signal and controls transmittance of light.

With such a structure, an entire region irradiated by the incident luminous flux is constituted of a transparent material, and therefore, the light-receiving elements on the image sensor 22 positioned below the spatial light modulation element 21 are all usable, and an image or image information including spatial information is obtained with higher resolution.

Additionally, in the measurement required for high accuracy, positioning of the spatial light modulation element 21 and the image sensor 22 regarding a horizontal position, rotation, parallelism, or the like is preferably performed with accuracy on the order of pixel size.

If a wet capillary type spatial light modulation element 21 is used, it is possible to produce all of the spatial light modulation element 21, the image sensor 22 and the gap-defining member 24 in a semiconductor process, and therefore, it is easy to integrally form the imaging module 2 without using an adhesive agent or the like. With such a structure, positioning with accuracy on the order of pixel size is possible, and therefore, compared to a case where the spatial light modulation element 21 and the image sensor 22 are integrated by using the adhesive agent or the like, it is possible to obtain image information with higher accuracy and higher resolution.

Maintaining a certain distance between the spatial light modulation element 21 and the image sensor 22, the spatial light modulation element 21 and the image sensor 22 are integrated and fixed, and electric wiring is performed with the wiring 25, and therefore, the imaging module 2 obtains image information including spatial information with higher resolution and/or higher accuracy without any restriction due to a mounting manner.

The imaging device 1 in the present embodiment has the controller 9, which is the element driver, which drives a spatial light modulation element to periodically change modulation, and a decoding-processing device 12 which removes the modulation from image information and reconstructs an image. By the above structure, the imaging device 1 forms an optimal coded-aperture pattern in accordance with a characteristic of a photographic subject or a photographing scene, and obtains an image and image information including spatial information.

Additionally, in the present embodiment, the controller 9, which is the element driver, uses a spatial transmittance distribution in which a plurality of sine waveforms different in cycle are superimposed, and applies spatial modulation to the luminous flux transmitting through the spatial light modulation element 21.

By the above structure, the imaging device 1 forms an optimal coded-aperture pattern on the spatial light modulation element 21 by using image characteristic information obtained from an image, and obtains an image with a high image quality in which a cause of image deterioration depending on a characteristic of a photographic subject or an imaging scene is removed.

Further, in the present embodiment, the controller 9, which is the element driver, periodically changes the modulation applied to the spatial light modulation element 21 based on the analysis result by the controller 9, which is the image characteristic-analyzing device, which analyzes image information.

By the above structure, the imaging device 1 forms an optimal coded-aperture pattern in accordance with a characteristic of a photographic subject or an imaging scene, and obtains an image with higher accuracy and image information including spatial information.

Generally, a liquid crystal device easily obtainable and effective in cost reduction is extremely large in size per cell of a liquid crystal element, compared to the size of a photodiode which is a light detector. Accordingly, there is a concern that the light detector is not effectively used for only controlling transmittance of the liquid crystal device and using it as the coded-aperture pattern, because the coded-aperture pattern and resolution of the imaging plane are different.

Figure 5:
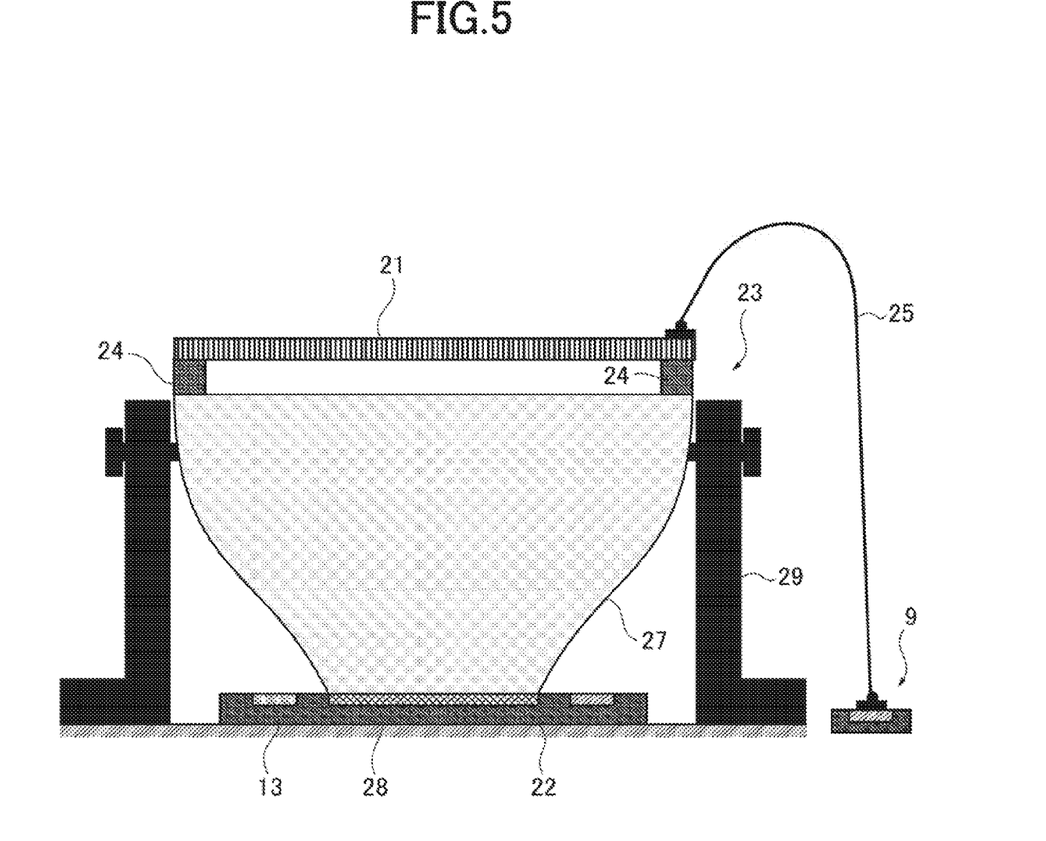
FIG. 5 is a diagram showing a first modified example of the structure of the imaging module in the embodiment of the present invention.

A first modified example of the imaging module 2 which solves such a concern will be explained.

In the imaging module 2 shown in FIG. 5, the structure of the fixing part 23 is different compared to the structure of the imaging module 2 shown in FIG. 2 which has been explained.

The fixing part 23 has a light guide path element 27 which guides the luminous flux incident from a surface on a side of the spatial light modulation element 21 (a surface on one side) to a surface on a side of the image sensor 22 (a surface on the other side), a support structural body 29 which supports the light guide path element 27, and a gap-defining member 24 which is arranged between the spatial light modulation element 21 and the light guide path element.

The light guide path element 27 is arranged and fixed between the image sensor 22 and the spatial light modulation element to have a certain distance to the spatial light modulation element 21, and has a tapered shape in which an aperture area on the surface on the side of the spatial light modulation element 21 and an aperture area on the surface of the image sensor 22 are different.

The light guide path element 27 is a tapered fiber plate in which a fiber plate made by bundling optical fibers is heated and extended, and then cut and polished, and resolution of the surface on the side of the spatial light modulation element 21 and resolution of the surface on the side of the image sensor 22 are different.

The light guide path element 27 is fixed to the image sensor 22 such that a surface having a narrow aperture area makes contact with the image sensor 22 as the imaging plane. The light guide path element 27 is integrally fixed to the spatial light modulation element 21 via the gap-defining member 24 which forms a gap structure of less than or equal to a few mm, preferably less than or equal to 1 mm, with respect to the spatial light modulation element 21.

With such a structure, the light guide path element 27 enlarges an area of the imaging plane to the same size as an area of the surface on the side of the spatial light modulation element 21 of the light guide path element 27 in a simulative manner, and changes resolution.

Therefore, even in a case where a pixel pitch of the spatial light modulation element 21 is larger than a pixel pitch of the image sensor 22 and resolutions are different, by an enlarged imaging plane, the spatial light modulation element 21 has higher resolution in the simulative manner, and an image with higher spatial resolution is obtained.

The spatial light modulation element 21 is connected to the controller 9 by an electric wiring 25.

In the present embodiment, the light guide path element 27 is connected to the spatial light modulation element 21 by the gap-defining member 24 which is arranged between the spatial light modulation element 21 and the light guide path element 27.

The image sensor 22 and the light guide path element 27 are arranged in contact with each other; however, by applying a matching oil, which suppresses reflection of light on a boundary surface, to a contact surface, utilization efficiency of the luminous flux is improved, and it is possible to perform imaging with a more favorable image quality.

Note that generally the pixel pitch of the spatial light modulation element 21 is larger than the pixel pitch of the image sensor 22, and therefore, the surface having the narrow aperture area of the light guide path element 27 is arranged to face the side of the image sensor 22; however, the surface having the narrow aperture area of the light guide path element 27 can be arranged to face the side of the spatial light modulation element 21.

In this case, the light guide path element 27 reduces the area of the imaging plane to the same size as the area of the surface on the side of the spatial light modulation element 21 of the light guide path element 27 in a simulative manner, and the image sensor 22 has high resolution in a simulative manner, and therefore, in particular, in a case where resolution of the image sensor is low, an image with higher resolution is obtained.

An explanation of the structure and the operation other than the explanation with reference to FIG. 5 is omitted since it is similar to the structure and the operation of the imaging module 2 shown in FIG. 2.

Figure 6:
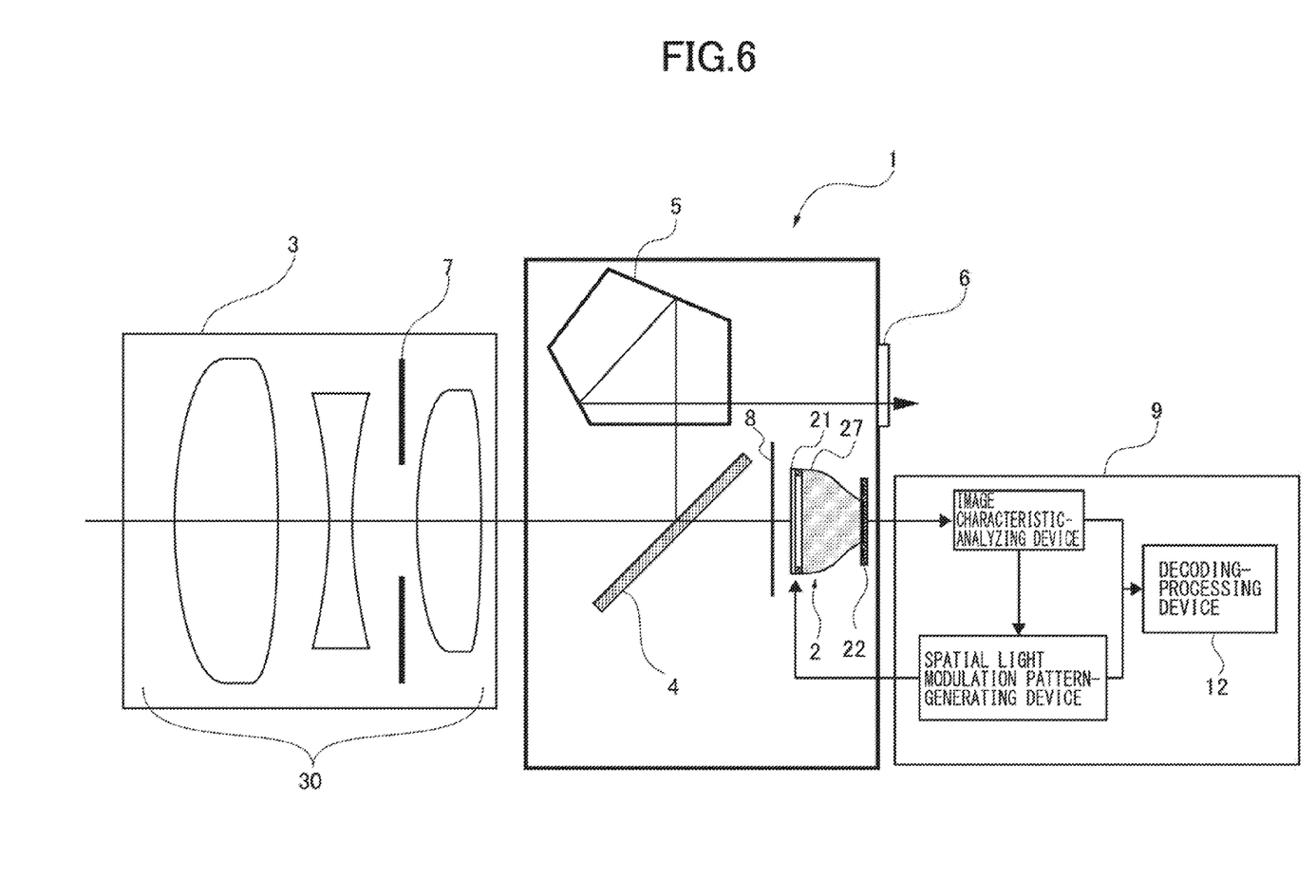
FIG. 6 is a diagram showing one example of a structure of an imaging module having a light guide path element and an imaging device in the embodiment of the present invention.

FIG. 6 shows a structure example of the imaging device 1 having the imaging module 2 shown in FIG. 5.

A difference from the imaging device shown in FIG. 1 will be explained. In the structure having the imaging module 2 in the first modified example, a simulative imaging plane is located on an incident surface of the light guide path element 27, that is, on the surface on the side of the spatial light modulation element 21 of the light guide path element 27, and the pixel pitch is enlarged compared to an actual imaging plane.

Therefore, in the image-forming optical system 3, an image circle as an image-forming region, which is an image-forming plane, needs to be set larger than the simulative imaging plane. If restrictions regarding the image-forming optical system 3 are satisfied, other structure of the imaging device 1 is similar to that of the imaging device 1 shown in FIG. 1, and the image-forming optical system 3 can be used for various cameras, such as interchangeable-lens cameras.

Figure 7:
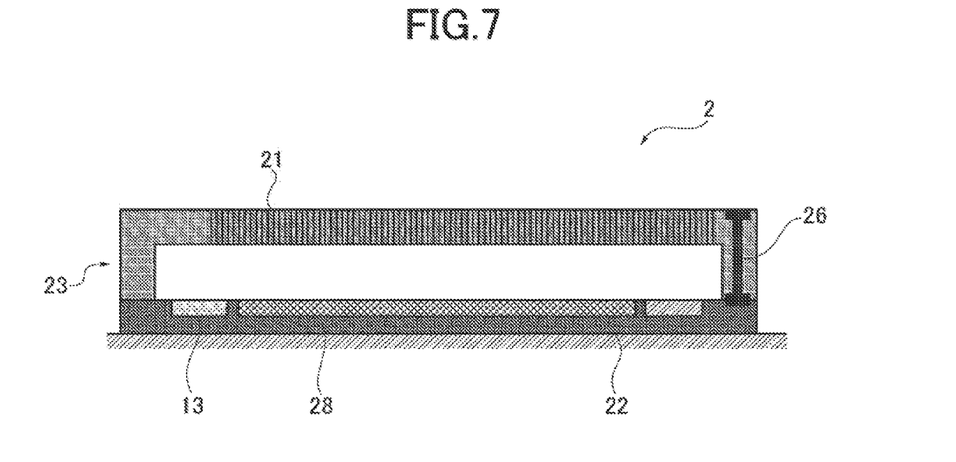
FIG. 7 is a diagram showing a second modified example of the structure of the imaging module in the embodiment of the present invention.

Additionally, for example, as a second modified example shown in FIG. 7, the imaging module 2 can be a structure in which the wet capillary type spatial light modulation element 21 and the fixing part 23 are integrally formed on the same substrate. At this time, the fixing part 23 has a function as the gap-defining member 24 and forms a void structure. With the structure shown in FIG. 7, a wafer-bonding technique in the semiconductor process is used for bonding of the spatial light modulation element 21 and the image sensor 22, and therefore, accuracy of parallelism and positioning between the spatial light modulation element 21 and the image sensor 22 is improved.

As the wafer boding technique, glass frit bonding, eutectic bonding by metal, or the like can be used.

Further, in this structure example, the spatial light modulation element 21 can be produced by use of vitrification by Si thermal oxidation. With such a structure, the imaging module 2 is produced only by a silicon process, a mass production cost is reduced, and accuracy is improved.

Note that in the structure in which the wafer-bonding technique in the semiconductor process is used for the bonding of the spatial light modulation element 21 and the image sensor 22, it is difficult to ensure a sufficient wiring space in a laminated portion.

Therefore, an electric connection between the spatial light modulation element 21 and the image sensor 22 is preferably performed by the through wiring 26 such as a Through-Silicon via (TSV), or the like. By the through wiring 26, a possibility of breakage when mounting a wiring or the like is reduced, interference of the spatial light modulation element 21, the image sensor 22, a substrate which controls those and the wiring is prevented or reduced, and image information including spatial information is obtained without any restriction due to a mounting manner.

By integrating the spatial light modulation element 21 and the image sensor 22 and performing an electric connection through a shortest path by the through wiring 26, noise in a case of periodically changing the transmittance of the spatial light modulation element 21 is reduced or suppressed, and image information with higher accuracy is obtained.

Figure 8:
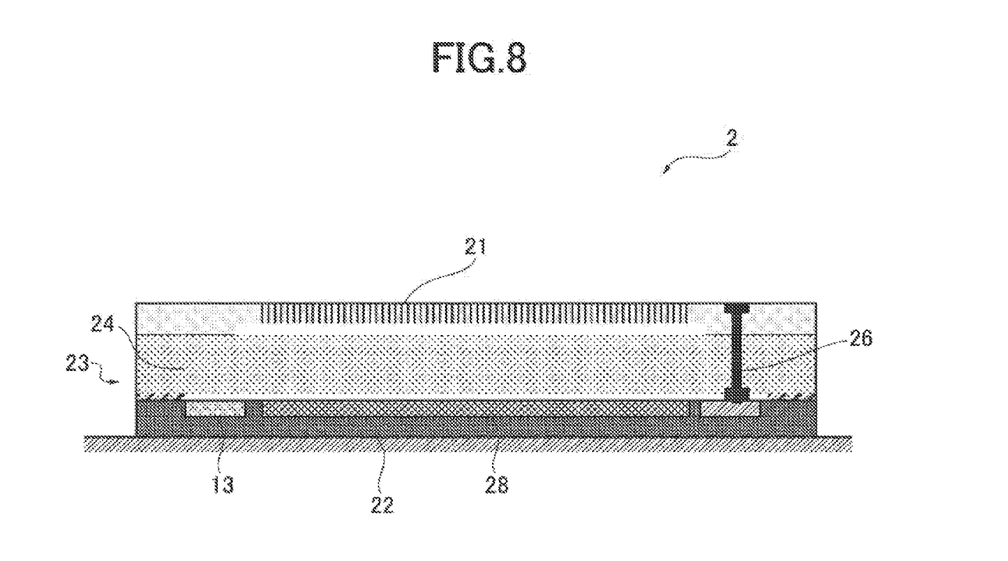
FIG. 8 is a diagram showing a third modified example of the structure of the imaging module in the embodiment of the present invention.

Furthermore, as a third modified example shown in FIG. 8, a structure can be a structure in which the spatial light modulation element 21 and the image sensor 22 and the fixing part 23 of the imaging module 2 are integrally arranged, and the gap-defining member 24 constituted of a transparent material such as a glass material, or the like is arranged inside.

With such a structure, by processing the spatial light modulation element 21 in a state of bonding with the transparent material, the thickness of the spatial light modulation element 21 is reduced, and miniaturization of the imaging module 2 is achieved.

Note that a bonding member 241 constituted of a glass frit material can be arranged between the gap-defining member 24 and the image sensor 22 as shown in FIG. 8.

Figure 9:
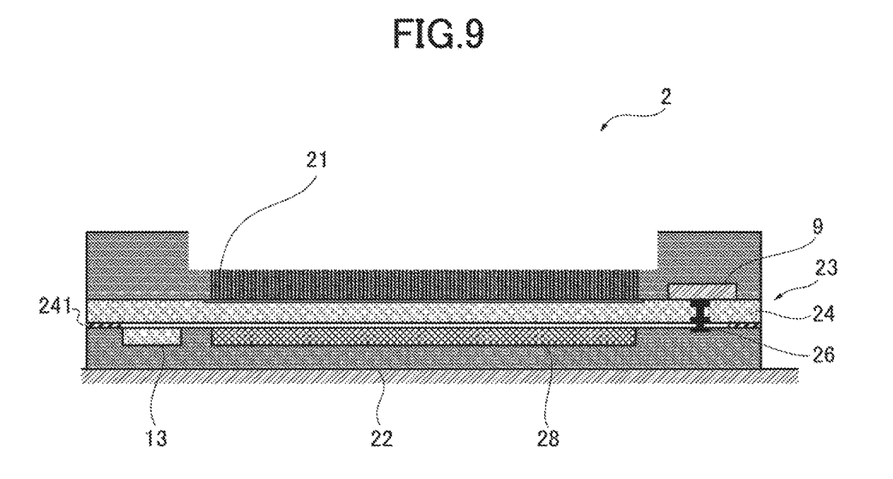
FIG. 9 is a diagram showing a fourth modified example of the structure of the imaging module in the embodiment of the present invention.

Additionally, as a fourth modified example shown in FIG. 9, if a structure is a structure in which the controller 9 is arranged on the spatial light modulation element 21, the gap structure is ensured by the gap-defining member 24 using a transparent material, and it is possible to have an area sufficient for circuit formation.

With such a structure, it is possible to miniaturize the imaging device 1.

Figure 10:
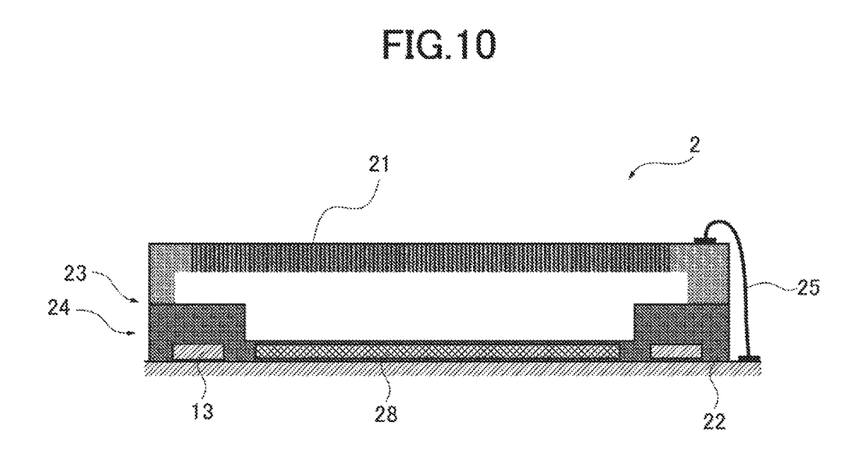
FIG. 10 is a diagram showing a fifth modified example of the structure of the imaging module in the embodiment of the present invention.

In addition, as a fifth modified example shown in FIG. 10, as the image sensor 22, a back-illuminated image sensor is used, and a gap distance between the image sensor 22 and the spatial light modulation element 21 is maintained and the thickness of the image sensor 22 is reduced, and therefore, it is possible to miniaturize the imaging module 2.

According to the embodiment of the present invention, it is possible to provide an imaging module and an imaging device in which a distance between an image sensor and a coded-aperture pattern is short and the image sensor and the coded-aperture pattern are arranged with high accuracy.

Although the present invention has been described in terms of exemplary embodiments, it is not limited thereto. It should be appreciated that variations may be made in the embodiments described by persons skilled in the art without departing from the scope of the present invention defined by the following claims.

For example, in the above embodiment, the imaging device 1 can be an imaging device of various types such as a compact digital camera, a compact camera mounted on a portable device, or the like.

According to the above-described embodiment, a spatial light modulation element which applies spatial modulation to an incident luminous flux and emits it, an image sensor which obtains the luminous flux to which the spatial modulation has been applied by the spatial light modulation element as image information, and a fixing member which integrally fixes the spatial light modulation element and the image sensor are included, and the fixing member has a gap-defining member which is arranged between the spatial light modulation element and the image sensor and forms a gap structure having a certain distance. Accordingly, a distance between the image sensor and a coded-aperture pattern is short, the image sensor and the coded-aperture pattern are arranged with high accuracy, deterioration of an image such as aliasing or the like is prevented, and spatial information of light is obtainable with high resolution and high accuracy.

The effects described in the embodiment of the present invention are most favorable effects generated from the present invention, and therefore, the effects according to the present invention are not limited to the descriptions of the embodiment of the present invention.

CROSS-REFERENCE TO RELATED APPLICATIONS

The present application is based on and claims priority from Japanese Patent Application Number 2014-003637, filed Jan. 10, 2014, the disclosure of which is hereby incorporated by reference herein in its entirety.

The invention claimed is:

1. An imaging module comprising:
a spatial light modulation element which applies spatial modulation to an incident luminous flux and emits it;
an image sensor which obtains the luminous flux to which the spatial modulation has been applied by the spatial light modulation element as image information; and
a fixing part which integrally fixes the spatial light modulation element and the image sensor,
wherein the fixing part has a gap-defining member which forms a gap structure which has a non-zero separation distance interposed spatially between the spatial light modulation element and the image sensor, and the gap structure interposed spatially between the spatial light modulation element and the image sensor is configured to permit the luminous flux to pass unobstructed from the spatial light modulation element to the image sensor.

2. The imaging module according to claim 1, wherein the fixing part has a light guide path element which guides a luminous flux incident from a surface on one side to a surface on the other side, the light guide path element is arranged and fixed between the image sensor and the spatial light modulation element to have a non-zero separation distance to the spatial light modulation element, and an aperture area of the surface on the one side and an aperture area of the surface on the other side are different.

3. The imaging module according to claim 1, comprising a through wiring which penetrates at least one of the spatial light modulation element and the image sensor and electrically connects the spatial light modulation element and the image sensor.

4. The imaging module according to claim 1, wherein the spatial light modulation element has a microporous structural body which is capable of storing liquid, and a transmittance-controlling device which adjusts an amount of the liquid in the microporous structural body by an electric signal and controls transmittance of light.

5. The imaging module according to claim 1, wherein the spatial light modulation element is a transmissive liquid crystal device.

6. An imaging device comprising:
the imaging module according to claim 1; and
an image-forming optical system which foil is an image on the image sensor.

7. The imaging device according to claim 6, comprising:
an element driver which drives the spatial light modulation element to periodically change the modulation; and
a decoding-processing device which removes the modulation from the image information and reconstructs an image.

8. The imaging device according to claim 7, wherein the element driver uses a spatial transmittance distribution in which a plurality of sine waveforms different in cycle are superimposed, and applies the modulation.

9. The imaging device according to claim 7, wherein the element driver periodically changes the modulation based on an analysis result by an image characteristic-analyzing device which analyzes the image information.

10. An imaging module comprising:
a spatial light modulation element which applies spatial modulation to an incident luminous flux and emits it;
an image sensor which obtains the luminous flux to which the spatial modulation has been applied by the spatial light modulation element as image information; and
a fixing part which integrally fixes the spatial light modulation element and the image sensor,
wherein the fixing part has a gap-defining member which (i) is formed of a transparent material to pass the luminous flux unobstructed from the spatial light modulation element to the image sensor, and (ii) forms a gap structure interposed spatially between the spatial light modulation element and the image sensor.

* * * * *